US012722533B2

(12) United States Patent
Lee

(10) Patent No.: US 12,722,533 B2
(45) Date of Patent: Sep. 1, 2026

(54) METHOD FOR CONTROLLING WALK-IN OPERATION OF VEHICLE SEAT

(71) Applicant: HYUNDAI TRANSYS INC., Seosan-si (KR)

(72) Inventor: Jin Woo Lee, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 364 days.

(21) Appl. No.: 18/246,583

(22) PCT Filed: Feb. 9, 2021

(86) PCT No.: PCT/KR2021/001687
§ 371 (c)(1),
(2) Date: Mar. 24, 2023

(87) PCT Pub. No.: WO2022/092450
PCT Pub. Date: May 5, 2022

(65) Prior Publication Data

US 2023/0365029 A1 Nov. 16, 2023

(30) Foreign Application Priority Data

Oct. 30, 2020 (KR) ........................ 10-2020-0142983

(51) Int. Cl.
*B60N 2/02* (2006.01)
*B60N 2/06* (2006.01)
*B60N 2/20* (2006.01)

(52) U.S. Cl.
CPC ............. *B60N 2/0256* (2023.08); *B60N 2/06* (2013.01); *B60N 2/20* (2013.01)

(58) Field of Classification Search
CPC .................................................... B60N 2/0256
See application file for complete search history.

(56) References Cited

U.S. PATENT DOCUMENTS 11,351,892 B1 * 6/2022 Roy .................. B60H 1/00564
2004/0108752 A1 * 6/2004 Rajasingham .......... B60R 21/02
296/68.1

(Continued)

FOREIGN PATENT DOCUMENTS

CN 103547479 A 1/2014
CN 108407671 A 8/2018

(Continued)

OTHER PUBLICATIONS

Machine Translation of JP2015058811A to Aisin Corp (2013).*

(Continued)

*Primary Examiner* — Jean Paul Cass
(74) *Attorney, Agent, or Firm* — Bridgeway IP Law Group, PLLC; Jihun Kim

(57) ABSTRACT

The present invention relates to a method of controlling a walk-in operation of a vehicle seat, which determines whether a walk-in switch 70 erroneously operates in consideration of the number of times the signal is generated and a signal filtering time when an operation signal of the walk-in switch 70 is generated during a walk-in operation or a walk-in return operation of a seat, continuously performs the walk-in operation or the walk-in return operation in case of an erroneous operation, and stops the walk-in operation or the walk-in return operation only in case of a normal operation according to a user's intention.

8 Claims, 3 Drawing Sheets

(56) References Cited

U.S. PATENT DOCUMENTS

2004/0130442 A1* 7/2004 Breed .................. G06V 20/593 340/449
2005/0192727 A1* 9/2005 Shostak .................. B60C 11/24 701/1
2006/0043776 A1* 3/2006 Rajasingham ..... B60N 2/42736 180/271
2011/0031055 A1* 2/2011 Rajasingham .......... B60R 21/18 180/271
2011/0046855 A1 2/2011 Hozumi et al.
2016/0229313 A1* 8/2016 Hozumi ................... B60N 2/99
2019/0046373 A1* 2/2019 Coulter ................ A61G 5/1089
2019/0248254 A1* 8/2019 Uno ..................... B60N 2/3011
2020/0064444 A1* 2/2020 Regani .................... G01S 7/006
2020/0189419 A1* 6/2020 Lee ...................... B60N 2/0228
2021/0138934 A1* 5/2021 Lee .......................... B60N 2/90
2023/0278469 A1* 9/2023 Jones ....................... B60N 2/01 296/65.12
2024/0174136 A1* 5/2024 Lim ....................... B60N 2/938
2024/0217396 A1* 7/2024 Han ..................... B60N 2/0279
2024/0338497 A1* 10/2024 Robinson ................ G06F 30/13
2024/0375556 A1* 11/2024 Han ..................... B60N 2/0273
2025/0026247 A1* 1/2025 Han ......................... B60N 2/22

FOREIGN PATENT DOCUMENTS

JP 2004-210159 A 7/2004
JP 2009-202666 A 9/2009
JP 2015-058811 A 3/2015
KR 10-2013-0024625 A 3/2013
KR 20200075385 A * 12/2018
KR 10-2020-0075385 A 6/2020

OTHER PUBLICATIONS

Machine Translation of JP2009202666A to Kaneda (2008) (Year: 2008).*
Machine Translation of KR20200075385A (2018) (Year: 2018).*
Machine Translation of JP2004210159A (Year: 2003).*
Machine Translation of CN108312930B to Wailai (2017) (Year: 2017).*

* cited by examiner

METHOD FOR CONTROLLING WALK-IN OPERATION OF VEHICLE SEAT

TECHNICAL FIELD

The present invention relates to a method of controlling a walk-in operation of a vehicle seat, and more particularly, to a technology associated with a method of controlling a walk-in operation of a vehicle seat, which is capable of preventing an erroneous walk-in operation at the time of operating a walk-in switch during a walk-in operation or a walk-in return operation of a seat.

BACKGROUND ART

In general, assuming that a driver seat and a passenger seat are first-row seats, there is a vehicle (recreational vehicle) in which second-row seats and third-row seats are provided rearward of the first-row seat.

In the case of the vehicle having the third-row seat, the second-row seat is equipped with a walk-in function that enables a passenger to be more conveniently seated in the third-row seat and get out of the vehicle.

The walk-in function of the seat refers to a technology for ensuring a sufficient space between the second-row seat and the third-row seat by sliding the second-row seat forward along a seat rail and rotating and folding a seatback forward when a user operates a walk-in switch in an initial state in which the second-row seat is positioned rearward of the seat rail and the seatback stands uprightly.

As the high-grade quality and convenience specifications of the vehicle are considered important, there are gradually increasing electric (power) specifications that allow the user to use the walk-in function of the seat by operating a walk-in switch.

In the case of the electric walk-in operation, when the user operates the walk-in switch, a seat slide motor and a seat recliner motor operate under the control of a seat controller, the second-row seat slides forward along a seat rail by the operations of the motors, and a seatback is automatically rotated forward and folded.

Typically, the walk-in switch is positioned at an upper end of the seatback of the second-row seat so that the passenger seated in the third-row seat smoothly operates the walk-in switch.

The passenger seated in the third-row seat gets out of the vehicle after the walk-in operation of the second-row seat is completed or while the second-row seat performs the walk-in operation. In this case, the passenger stably gets out of the vehicle while holding the seatback of the second-row seat with his/her hand. In this process, the passenger in the third-row seat often erroneously operates the walk-in switch.

When the passenger in the third-row seat erroneously operates the walk-in switch while getting out of the vehicle, the second-row seat moves toward the rear side of the seat rail and returns to the initial position, and the seatback stands again. For this reason, the passenger in the third-row seat, who is getting out of the vehicle, is jammed between a door and the second-row seat being returned by the return operation of the seat, which causes an injury to the passenger.

The foregoing explained as the background is intended merely to aid in the understanding of the background of the present invention, and is not intended to mean that the present invention falls within the purview of the related art that is already known to those skilled in the art.

As the related art, there is KR 10-2013-0024625A.

DISCLOSURE

Technical Problem

An object of the present invention is to provide a method of controlling a walk-in operation of a vehicle seat, which determines whether a walk-in switch erroneously operates when an operation signal of the walk-in switch is generated during a walk-in operation or a walk-in return operation of a seat, continuously performs the walk-in operation or the walk-in return operation of the seat in case of an erroneous operation, and stops the walk-in operation or the walk-in return operation only in case of a normal operation according to a user's intention, which makes it possible to prevent a passenger from being injured by an erroneous walk-in operation.

Technical Solution

To achieve the above-mentioned object, the present invention provides a method of controlling a walk-in operation of a vehicle seat, the method including: a first determination step of determining whether a signal of a walk-in switch is generated during a walk-in operation of a vehicle seat; a second determination step of determining the number of times the signal is generated when the determination result in the first determination step indicates that the signal of the walk-in switch is generated; and a third determination step of determining whether a position to which the seat slides forward and a recliner angle of a seatback satisfy a condition for disembarking of a passenger when the determination result in the second determination step indicates that the signal of the walk-in switch is generated once, in which when the determination result in the third determination step indicates that the condition for disembarking of the passenger is not satisfied, the walk-in operation of the vehicle seat is continuously performed under the control of a seat controller, and the walk-in operation is completed.

The method may further include: a fourth determination step of determining whether a signal generation duration time (s) exceeds a filtering time when the determination result in the third determination step indicates that the condition for disembarking of the passenger is satisfied, in which when the determination result in the fourth determination step indicates that the signal generation duration time (s) exceeds the filtering time, the seat controller determines that the passenger's intention is applied, and the seat controller performs control to stop the walk-in operation of the seat.

When the determination result in the fourth determination step indicates that the signal generation duration time (s) does not exceed the filtering time, the walk-in operation of the vehicle seat may be continuously performed under the control of the seat controller, and the walk-in operation may be completed.

When the determination result in the first determination step indicates that the signal of the walk-in switch is not generated, the walk-in operation of the vehicle seat may be continuously performed under the control of the seat controller, and the walk-in operation may be completed.

When the determination result in the second determination step indicates that the signal of the walk-in switch is generated two or more times, the seat controller may determine that the passenger's intention is applied, and the seat controller may perform control to stop the walk-in operation of the seat.

The method may further include: a fifth determination step of determining whether the signal of the walk-in switch is generated during a walk-in return operation after the walk-in operation is completed; a sixth determination step of determining the number of times the signal is generated when the determination result in the fifth determination step indicates that the signal of the walk-in switch is generated; and a seventh determination step of determining whether a signal generation duration time (s) exceeds a filtering time when the determination result in the sixth determination step indicates that the signal of the walk-in switch is generated once, in which when the determination result in the seventh determination step indicates that the signal generation duration time (s) exceeds the filtering time, the seat controller determines that the passenger's intention is applied, and the seat controller performs control to stop the walk-in operation of the seat.

When the determination result in the seventh determination step indicates that the signal generation duration time (s) does not exceed the filtering time, the walk-in return operation of the vehicle seat may be continuously performed under the control of the seat controller, and the walk-in return operation may be completed.

When the determination result in the sixth determination step indicates that the signal of the walk-in switch is generated two or more times, the seat controller may determine that the passenger's intention is applied, and the seat controller may perform control to stop the walk-in return operation of the seat.

Further, the present invention provides a method of controlling a walk-in operation of a vehicle seat, the method including: generating an operation signal of a walk-in switch during a walk-in operation or a walk-in return operation of a seat; and determining whether the walk-in switch erroneously operates in consideration of the number of times the signal of the walk-in switch is generated and a signal filtering time, in which when the determination result indicates that the signal of the walk-in switch is an erroneous operation, the walk-in operation or the walk-in return operation of the vehicle seat is continuously performed under the control of a seat controller until the walk-in operation or the walk-in return operation is completed, and in which when the determination result indicates that the signal of the walk-in switch is a normal operation according to a user's intention, the walk-in operation or the walk-in return operation of the seat is stopped by control of the seat controller.

When the signal of the walk-in switch is generated once during the walk-in operation or the walk-in return operation of the seat and a signal generation duration time of the walk-in switch, which has generated the signal once, does not exceed the filtering time, the seat controller may determine that a passenger erroneously operates the walk-in switch, and the seat controller may perform control to continuously perform the walk-in operation or the walk-in return operation until the walk-in operation or the walk-in return operation is completed.

When the signal of the walk-in switch is generated once during the walk-in operation or the walk-in return operation of the seat and a signal generation duration time of the walk-in switch, which has generated the signal once, exceeds the filtering time, the seat controller may determine that a passenger's intention of stopping the walk-in operation or the walk-in return operation is applied, and the seat controller may perform control to stop the walk-in operation or the walk-in return operation.

When the signal of the walk-in switch is generated two or more times within a predetermined time during the walk-in operation or the walk-in return operation of the seat, the seat controller may determine that a passenger's intention of stopping the walk-in operation or the walk-in return operation is applied, and the seat controller may perform control to stop the walk-in operation or the walk-in return operation.

Advantageous Effects

The method of controlling a walk-in operation of a vehicle seat according to the present invention determines whether the walk-in switch erroneously operates in consideration of the number of times the signal is generated and a signal filtering time when the operation signal of the walk-in switch is generated during the walk-in operation or the walk-in return operation of the seat, continuously performs the walk-in operation or the walk-in return operation in case of an erroneous operation, and stops the walk-in operation or the walk-in return operation only in case of a normal operation according to a user's intention, which makes it possible to prevent the passenger from being injured by the erroneous walk-in operation.

DETAILED DESCRIPTION FOR INVENTION

Figure 1:
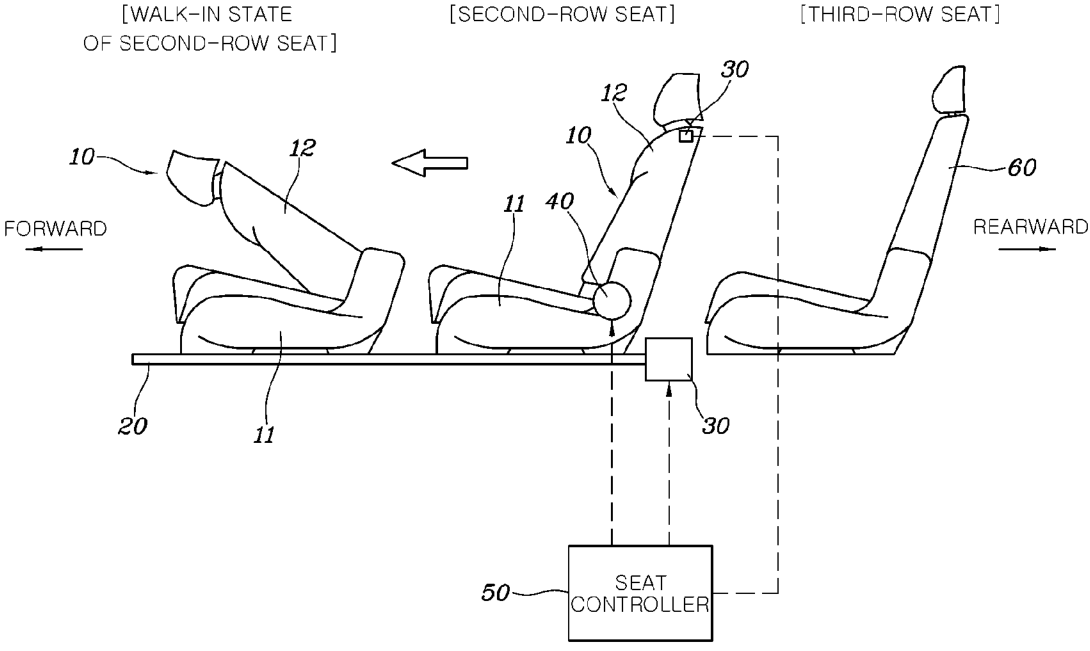
FIG. 1 is a schematic configuration view for explaining a method of controlling a walk-in operation of a vehicle seat according to the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an exemplary embodiment of the present invention may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, a method of controlling a walk-in operation of a vehicle seat according to an exemplary embodiment of the present invention will be described with reference to the accompanying drawings.

Figure 2:
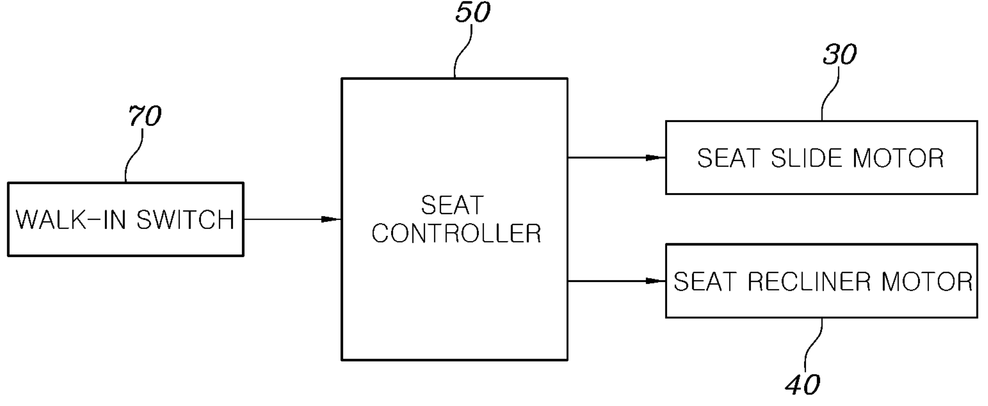
FIGS. 2 and 3 are a block diagram and a flowchart according to the present invention.

As illustrated in FIGS. 1 and 2, a second-row seat 10 of a vehicle includes a seat cushion 11 and a seatback 12. The seat cushion 11 is coupled to a seat rail 20 and slides along the seat rail 20 forward or rearward. The seatback 12 may rotate forward or rearward relative to the seat cushion 11, such that an angle of the seatback 12 may be adjusted.

The seat rail 20 includes a fixed rail coupled to a floor of a vehicle body and extending in a forward/rearward direction, a movable rail configured to move along the fixed rail, a seat slide motor 30 configured to generate power for moving the movable rail, and a connector including a gear configured to transmit power of the slide motor 30 to the movable rail. The movable rail is connected to the seat cushion 11.

Further, an angle of the seatback 12 may be adjusted by a recliner and a seat recliner motor 40 configured to generate power for operating the recliner.

Operations of both the seat slide motor 30 and the seat recliner motor 40 are controlled by a seat controller 50. A signal of a walk-in switch 70 provided at an upper end of the seatback 12 of the second-row seat 10 is inputted to the seat controller 50.

Reference numeral 60 indicates a third-row seat.

Therefore, when a passenger operates the walk-in switch 70 of the second-row seat 10, the seat slide motor 30 and the seat recliner motor 40 operate under the control of the seat controller 50, the second-row seat 10 slides forward along the seat rail 20 by the operations of the motors 30 and 40, and the seatback 12 is rotated forward and folded, such that a walk-in operation is implemented. Further, a walk-in return operation, which is reverse to the walk-in operation, is also possible.

Figure 3:
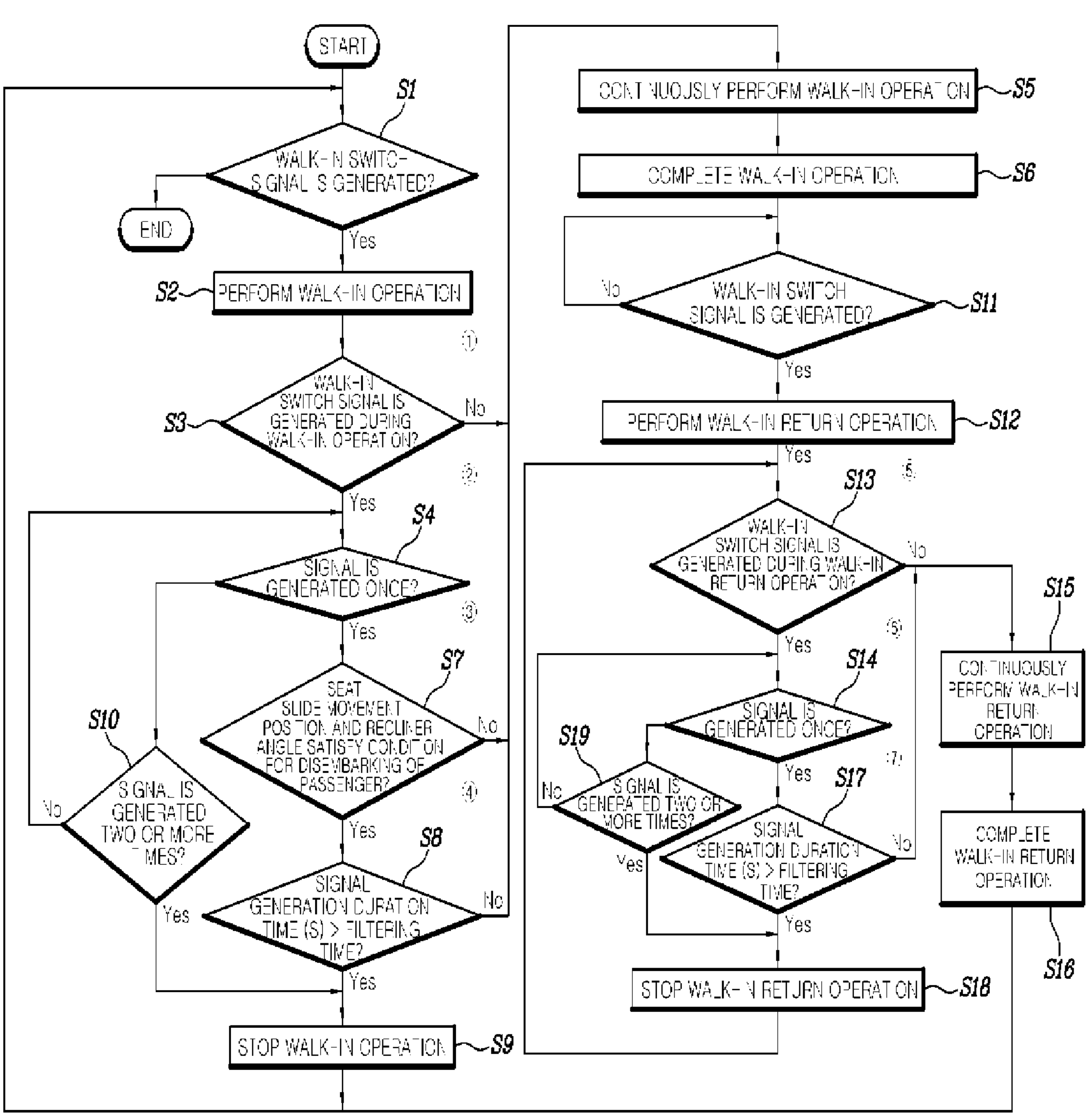

A method of controlling a walk-in operation of a vehicle seat according to the present invention will be described with reference to a flowchart in FIG. 3.

When a signal is generated as a passenger in a third-row seat 60 operates the walk-in switch 70 of the second-row seat 10 to get out of the vehicle (step S1), the seat slide motor 30 and the seat recliner motor 40 operate under the control of the seat controller 50, the second-row seat 10 slides along the seat rail 20, and the seatback 12 is rotated forward and folded, such that the walk-in operation is performed (step S2).

When the passenger operates the walk-in switch 70 of the third-row seat 60 during the walk-in operation of the second-row seat 10, the signal is also generated even in this case, and the seat controller 50 determines whether the signal of the walk-in switch 70 is generated (a first determination step, step S3).

When the determination result in the first determination step (step S3) indicates that the signal of the walk-in switch 70 is generated, the seat controller 50 determines the number of times the signal is generated (a second determination step, step S4).

However, when the determination result in the first determination step (step S3) indicates that the signal of the walk-in switch 70 is not generated, the walk-in operation of the vehicle seat is continuously performed under the control of the seat controller 50 (step S5), and then the walk-in operation is finally completed (step S6).

When the determination result in the second determination step (step S4) indicates that the signal of the walk-in switch is generated once, the seat controller 50 determines whether a position to which the seat slides forward and a recliner angle of the seatback 12 satisfy a condition for disembarking of the passenger (a third determination step, step S7).

In the case of a minimum condition for disembarking of the passenger in the third-row seat 60, a forward sliding position of the second-row seat 10 may be defined as a minimum slide position at which the passenger in the third-row seat 60 may get out of the vehicle. Further, a forward folding angle of the seatback 12 of the second-row seat 10 may be defined as a minimum rotation angle at which the passenger in the third-row seat 60 may get out of the vehicle.

The seat controller 50 may use rotational speeds of the seat slide motor 30 and the seat recliner motor 40 to determine the minimum condition for disembarking of the passenger in the third-row seat 60. Alternatively, the seat controller 50 may use a position sensor, a rotation sensor, a camera sensor, or the like to determine the minimum condition for disembarking of the passenger in the third-row seat 60.

When the determination result in the third determination step (step S7) indicates that the condition for disembarking of the passenger is not satisfied, the walk-in operation of the vehicle seat is continuously performed under the control of the seat controller 50, such that the walk-in operation is continuously performed (step S5), and then the walk-in operation is finally completed (step S6).

However, when the determination result in the third determination step (step S7) indicates that the condition for disembarking of the passenger is satisfied, the seat controller 50 determines whether a signal generation duration time (s) of the walk-in switch 70 exceeds a filtering time (a fourth determination step, step S8).

The filtering time related to the signal of the walk-in switch 70 may be set to about 5 seconds, but the filtering time may be changed, as necessary.

When the determination result in the fourth determination step (step S8) indicates that the signal generation duration time (s) exceeds the filtering time, the seat controller 50 determines that the passenger's intention of stopping the walk-in operation is applied, such that the seat controller 50 performs control to stop the walk-in operation of the seat, and the walk-in operation of the seat is immediately stopped (step S9).

However, when the determination result in the fourth determination step (step S8) indicates that the signal generation duration time (s) does not exceed the filtering time, the walk-in operation of the vehicle seat is continuously performed under the control of the seat controller 50, and the walk-in operation is completed (steps S5 and S6).

That is, in case that the signal of the walk-in switch 70 is generated once during the walk-in operation and the signal generation duration time (s) does not exceed the filtering time, the seat controller 50 determines that the passenger in the third-row seat 60 erroneously operates the walk-in switch 70 while getting out of the vehicle. In this case, if the walk-in operation of the seat is suddenly stopped, the passenger in the third-row seat 60, who is getting out of the vehicle, may collide with the second-row seat 10 and get injured. To prevent this situation, the walk-in operation is continuously performed until the walk-in operation is completed.

Further, when the determination result in the second determination step (step S4) indicates that the signal of the walk-in switch is generated two or more times within a predetermined time (e.g., 2 to 3 seconds) (step S10), the seat controller 50 determines that the passenger's intention of stopping the walk-in operation is applied, such that the seat controller 50 performs control to stop the walk-in operation of the seat, and the walk-in operation of the seat is immediately stopped (step S9).

Further, when the signal is generated by the operation of the walk-in switch 70 (step S11) after the walk-in operation is completed (step S6), the seat slide motor 30 and the seat recliner motor 40 operate under the control of the seat controller 50, the second-row seat 10 returns to an initial position while sliding rearward along the seat rail 20, and the seatback 12, which has been rotated and folded forward, is rotated rearward to be restored and stand, such that the walk-in return operation of the second-row seat 10 is performed (step S12).

Even when the passenger operates the walk-in switch 70 during the walk-in return operation of the second-row seat 10, a signal is also generated, and the seat controller 50 determines whether the signal of the walk-in switch 70 is generated (a fifth determination step, step S13).

When the determination result in the fifth determination step (step S13) indicates that the signal of the walk-in switch 70 is generated, the seat controller 50 determines the number of times the signal is generated (a sixth determination step, step S14).

However, when the determination result in the fifth determination step (step S13) indicates that the signal of the walk-in switch 70 is not generated, the walk-in return operation of the vehicle seat is continuously performed under the control of the seat controller 50 (step S15), and then the walk-in return operation is finally completed (step S16).

When the determination result in the sixth determination step (step S14) indicates that the signal of the walk-in switch is generated once, the seat controller 50 determines whether the signal generation duration time (s) of the walk-in switch 70 exceeds the filtering time (a seventh determination step, step S17).

Even in this case, the filtering time related to the signal of the walk-in switch 70 may be set to about 5 seconds, but the filtering time may be changed, as necessary.

When the determination result in the seventh determination step (step S17) indicates that the signal generation duration time (s) exceeds the filtering time, the seat controller 50 determines that the passenger's intention of stopping the walk-in operation is applied, such that the seat controller 50 performs control to stop the walk-in operation of the seat, and the walk-in operation of the seat is immediately stopped (step S18).

However, when the determination result in the seventh determination step (step S17) indicates that the signal generation duration time (s) does not exceed the filtering time, the walk-in return operation of the vehicle seat is continuously performed under the control of the seat controller 50, and the walk-in return operation is completed (steps S15 and S16).

That is, in case that the signal of the walk-in switch 70 is generated once during the walk-in return operation and the signal generation duration time (s) does not exceed the filtering time, the seat controller 50 determines that the passenger erroneously operates the walk-in switch 70. In this case, if the walk-in return operation of the seat is suddenly stopped, the passenger in the third-row seat 60, who is getting in or out of the vehicle, may collide with the second-row seat 10 and get injured. To prevent this situation, the walk-in return operation is continuously performed until the walk-in return operation is completed.

Further, when the determination result in the sixth determination step (step S14) indicates that the signal of the walk-in switch is generated two or more times within a predetermined time (e.g., 2 to 3 seconds) (step S19), the seat controller 50 determines that the passenger's intention of stopping the walk-in return operation is applied, such that the seat controller 50 performs control to stop the walk-in return operation of the seat, and the walk-in return operation of the seat is immediately stopped (step S18).

As described above, the method of controlling a walk-in operation of a vehicle seat according to the present invention determines whether the walk-in switch 70 erroneously operates in consideration of the number of times the signal is generated and a signal filtering time when the operation signal of the walk-in switch 70 is generated during the walk-in operation or the walk-in return operation of the seat, continuously performs the walk-in operation or the walk-in return operation in case of an erroneous operation, and stops the walk-in operation or the walk-in return operation only in case of a normal operation according to a user's intention, which makes it possible to prevent the passenger from being injured by the erroneous walk-in operation.

While the specific embodiments of the present invention have been illustrated and described, it will be obvious to those skilled in the art that the present invention may be variously modified and changed without departing from the technical spirit of the present invention defined in the appended claims.

| [Description of Reference Numerals] | |
|---|---|
| 10: Second-row seat | 11: Seat cushion |
| 12: Seatback | 20: Seat rail |
| 30: Slide motor | 40: Seat recliner motor |
| 50: Seat controller | 60: Third-row seat |
| 70: Walk-in switch | |

The invention claimed is:

1. A method of a vehicle for controlling a walk-in operation of a vehicle seat, the method comprising:

a first determination step of determining whether a signal of a walk-in switch provided at an upper end of the vehicle seat is generated during the walk-in operation of the vehicle seat;

a second determination step of determining a number of times the signal is generated when a result in the first determination step indicates that the signal of the walk-in switch is generated;

a third determination step of determining whether a position to which the vehicle seat slides forward and a recliner angle of a seatback satisfy a condition for disembarking of a passenger when a result in the second determination step indicates that the signal of the walk-in switch is generated once, wherein the condition for disembarking of the passenger is based on a minimum slide position and a minimum rotation angle of the vehicle seat at which the passenger gets out of the vehicle; and a fourth determination step of determining whether a duration time of the signal exceeds a filtering time when the result in the third determination step indicates that the condition for disembarking of the passenger is satisfied, wherein when a result in the third determination step indicates that the condition for disembarking of the passenger is not satisfied, the walk-in operation of the vehicle seat is continuously performed under a control of a seat controller until the walk-in operation is completed, wherein when the result in the fourth determination step indicates that the duration time exceeds the filtering time, the seat controller determines that an intention of the passenger to stop the walk-in operation is properly applied by the signal and stops the walk-in operation of the vehicle seat, and wherein when the result in the second determination step indicates that the signal of the walk-in switch is generated two or more times, the seat controller is configured to stop the walk-in operation of the vehicle seat.

2. The method of claim 1, wherein when the result in the fourth determination step indicates that the duration time does not exceed the filtering time, the walk-in operation of the vehicle seat is continuously performed under the control of the seat controller until the walk-in operation is completed.

3. The method of claim 1, wherein when the result in the first determination step indicates that the signal of the walk-in switch is not generated, the walk-in operation of the vehicle seat is continuously performed under the control of the seat controller until the walk-in operation is completed.

4. The method of claim 1, further comprising:

a fifth determination step of determining whether the signal of the walk-in switch is generated during a walk-in return operation after the walk-in operation is completed;

a sixth determination step of determining the number of times the signal is generated when a result in the fifth determination step indicates that the signal of the walk-in switch is generated; and a seventh determination step of determining whether a duration time of the signal exceeds a filtering time when the result in the sixth determination step indicates that the signal of the walk-in switch is generated once, wherein when the result in the seventh determination step indicates that the duration time exceeds the filtering time, the seat controller is configured to stop the walk-in operation of the vehicle seat.

5. The method of claim 4, wherein when the result in the seventh determination step indicates that the duration time does not exceed the filtering time, the walk-in return operation of the vehicle seat is continuously performed under the control of the seat controller until the walk-in return operation is completed.

6. The method of claim 4, wherein when the result in the sixth determination step indicates that the signal of the walk-in switch is generated two or more times, the seat controller is configured to stop the walk-in return operation of the vehicle seat.

7. A method of a vehicle for controlling a walk-in operation or a walk-in return operation of a vehicle seat, the method comprising:

generating a signal of a walk-in switch provided at an upper end of the vehicle seat during the walk-in operation or the walk-in return operation of the vehicle seat; and determining whether the walk-in switch erroneously operates in consideration of a number of times the signal of the walk-in switch is generated and a signal filtering time, wherein when a result of the determining indicates that the signal of the walk-in switch is an erroneous operation, the walk-in operation or the walk-in return operation of the vehicle seat is continuously performed under a control of a seat controller until the walk-in operation or the walk-in return operation is completed, wherein when the result indicates that the signal of the walk-in switch is a normal operation, the walk-in operation or the walk-in return operation of the vehicle seat is stopped by the control of the seat controller, wherein when the signal of the walk-in switch is generated once during the walk-in operation or the walk-in return operation of the vehicle seat and a duration time of the signal of the walk-in switch exceeds the signal filtering time, the seat controller determines that a passenger's intention of stopping the walk-in operation or the walk-in return operation is properly applied and stops the walk-in operation or the walk-in return operation, and wherein when the signal of the walk-in switch is generated two or more times within a predetermined time during the walk-in operation or the walk-in return operation of the vehicle seat, the seat controller is configured to stop the walk-in operation or the walk-in return operation.

8. The method of claim 7, wherein when the signal of the walk-in switch is generated once during the walk-in operation or the walk-in return operation of the vehicle seat and a duration time of the signal of the walk-in switch does not exceed the signal filtering time, the seat controller is configured to continuously perform the walk-in operation or the walk-in return operation until the walk-in operation or the walk-in return operation is completed.

* * * * *